United States Patent [19]
Haupt et al.

[11] 3,857,179
[45] Dec. 31, 1974

[54] CHAIN SAW

[75] Inventors: Eugene J. Haupt, Flossmoor; Robert M. Shymkus, Country Club Hills, both of Ill.

[73] Assignee: Desa Industries, Inc., Cockeysville, Md.

[22] Filed: Apr. 22, 1974

[21] Appl. No.: 462,975

[52] U.S. Cl. .............................. 30/381, 74/243 CS
[51] Int. Cl. ............................................ B27b 17/08
[58] Field of Search ............ 30/381, 386, 371, 372, 30/373; 74/243 CS, 438

[56] References Cited
UNITED STATES PATENTS

| | | | |
|---|---|---|---|
| 511,169 | 12/1893 | Snider | 74/438 |
| 3,045,502 | 7/1962 | Carlton | 30/381 X |
| 3,494,213 | 2/1970 | Schoenfeld | 74/243 CS |
| 3,669,162 | 6/1972 | Irgens | 30/371 |

Primary Examiner—Al Lawrence Smith
Assistant Examiner—J. C. Peters

[57] ABSTRACT

An electric chain saw includes exposed drive gears which provide their own protection against sawdust. A cup-shaped driven gear includes a cylindrical side wall and a flat end wall, and gear teeth are provided on the inside surface of the side wall. A drive gear is mounted on the drive shaft of an electric motor and engages the gear teeth of the driven gear. An electric motor is mounted on the housing of the chain saw, and the drive shaft of the motor extends through a portion of the housing which is positioned adjacent the open end of the driven gear to substantially enclose the gear teeth of the gears. The housing may include an arcuate wall which extends around the outer periphery of the driven gear to further enclose the gears. A sprocket for the saw chain is mounted on the outside of the end wall and is drivingly engaged with the chain.

11 Claims, 6 Drawing Figures

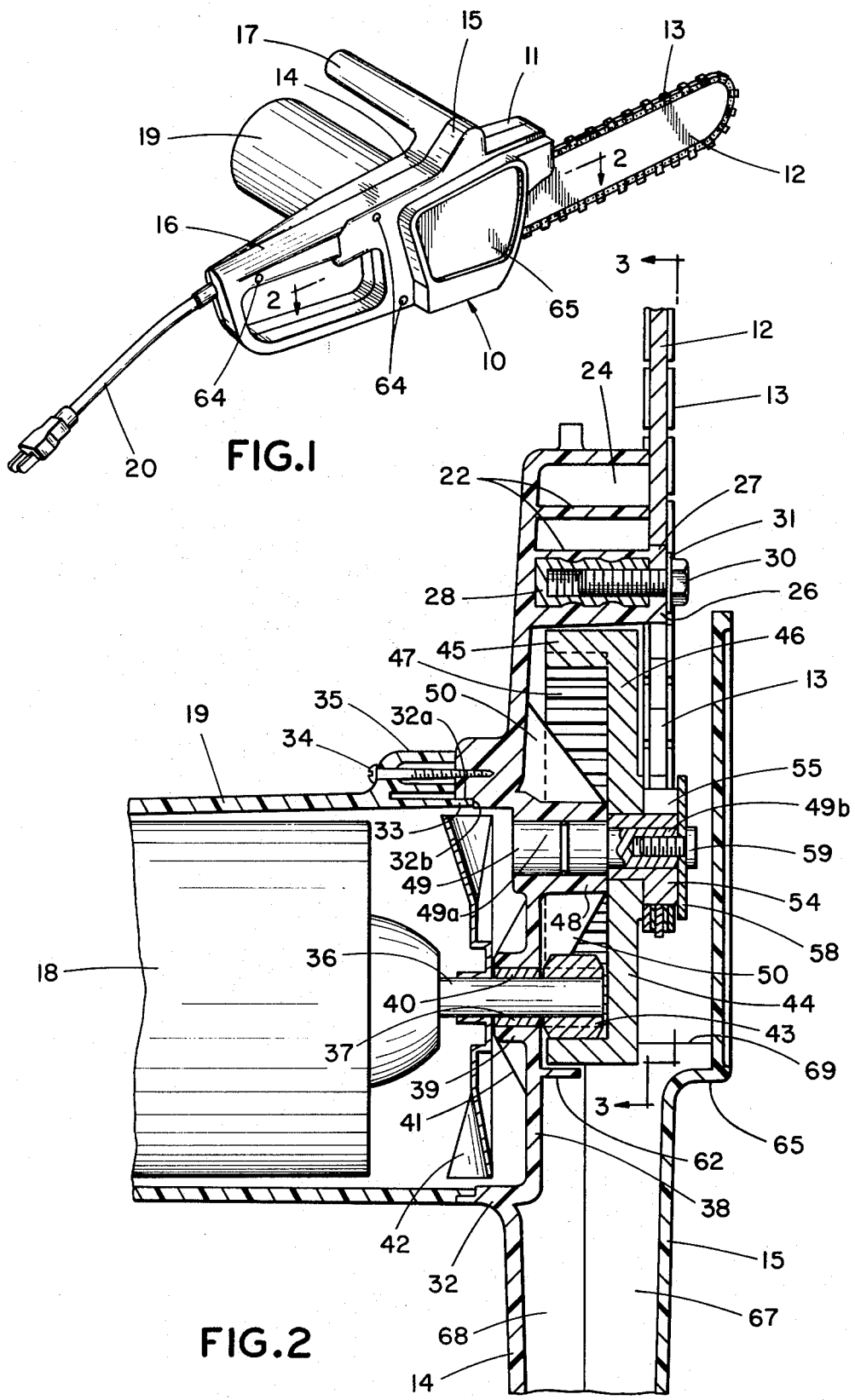

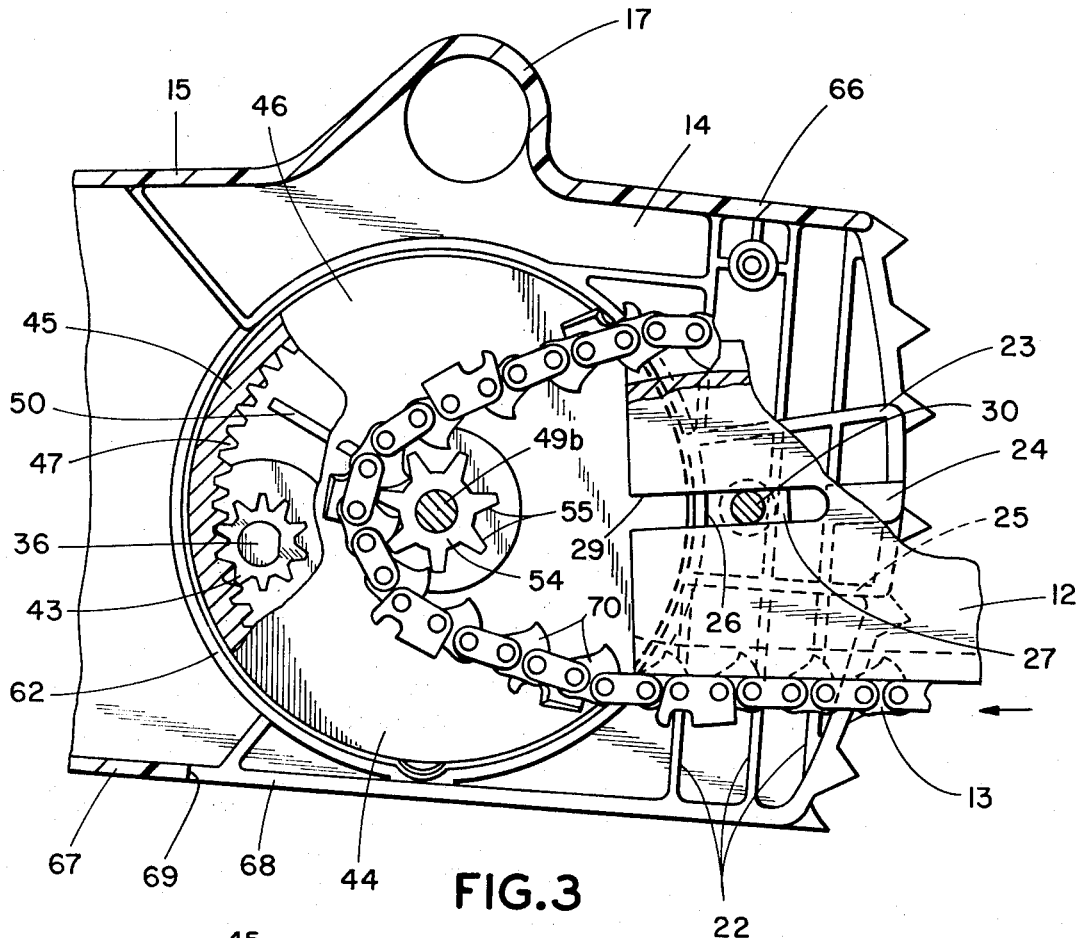
FIG.3
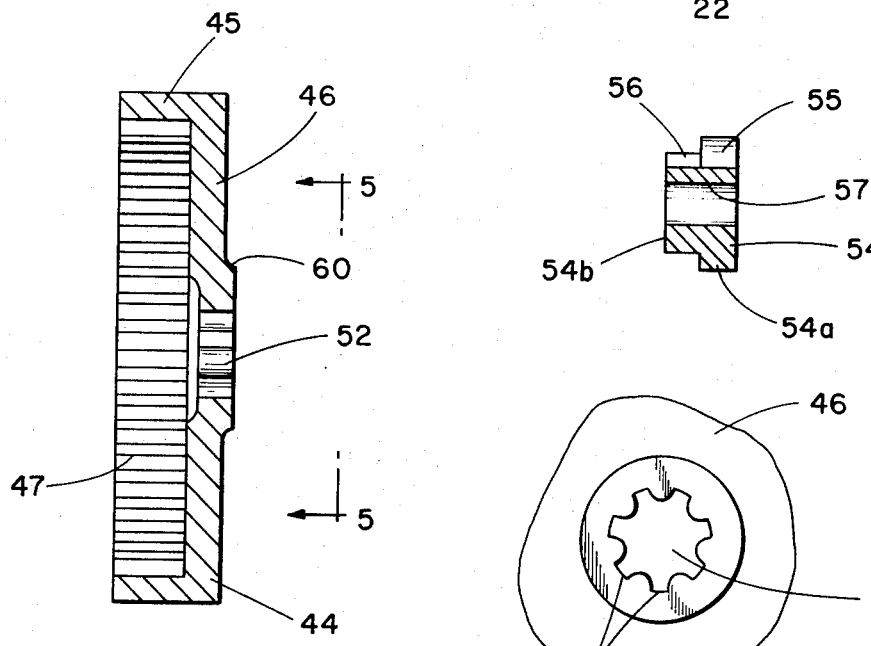
FIG.4
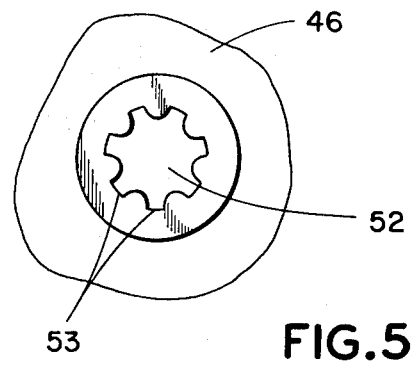
FIG.6
FIG.5

CHAIN SAW

BACKGROUND

This invention relates to chain saws, and more particularly, to a low cost yet durable and reliable electric chain saw.

The use of chain saws for various cutting jobs around the house is becoming increasingly popular. As the cost of these saws has decreased, more and more homeowners have decided that they can afford to purchase a chain saw even for only occasional cutting jobs.

Because of the nature of the job they are required to do, chain saws generally have included certain structural features. For example, electric saws, which are provided with gear reduction between the motor and the saw chain, have the gears completely enclosed within a sealed gear housing so that sawdust, dirt and other foreign material cannot reach the gears. This increases the cost of the gear reduction and also requires a separate drive sprocket for the chain to be mounted outside the gear housing.

SUMMARY

Chain saws formed in accordance with the invention can be made more economically, more compact, and more light-weight than chain saws heretofore available. Although a gear reduction is provided between the motor and the drive sprocket, the gears are not enclosed within a sealed housing. Rather, the gears provide their own protection. The large, driven gear is generally cup-shaped and includes internal gear teeth on the inside surface of a cylindrical side wall. The open end of the driven gear is substantially closed by a wall of the saw housing and the drive gear is positioned within the driven gear. This not only substantially reduces the cost and size of the gear reduction but permits the drive sprocket to be connected directly to the driven gear. The driven gear has a substantial part of its weight at a distance from its center and therefore has a favorable moment of inertia to help provide smooth cutting even at low speeds.

DESCRIPTION OF THE DRAWING

The invention will be explained in conjunction with an illustrative embodiment shown in the accompanying drawings, in which FIG. 1 is a perspective view of a compact, low cost electric chain saw formed in accordance with the invention;

FIG. 2 is an enlarged fragmentary longitudinal sectional view taken generally along the line 2—2 of FIG. 1;

FIG. 3 is a fragmentary sectional view taken along the line 3—3 of FIG. 3;

FIG. 4 is a sectional view of the driven gear;

FIG. 5 is a fragmentary plan view of the driven gear taken along the line 5—5 of FIG. 4; and FIG. 6 is a sectional view of the chain sprocket.

DESCRIPTION OF SPECIFIC EMBODIMENT

Referring first to FIG. 1, the numeral 10 designates a chain saw having a housing 11, a guide bar 12 mounted in the housing and extending therefrom, and a saw chain 13 slidably supported around the periphery of the guide bar. The housing is formed from a pair of halves—a gear housing 14 and a cover 15—includes a right hand handle 16 and a left hand grip or handle 17.

The particular chain saw illustrated is an electric saw, and an electric motor 18 (FIG. 2) is mounted within a motor housing 19 secured to the gear housing 14. A power supply cord 20 for the motor extends from the handle 16, and the cord is connected to a trigger switch (not shown) in the handle 16.

The gear housing 14, cover 15, and the motor housing 19 may all be formed of plastic to reduce the weight of the saw, and each of these parts can be integrally formed by injection molding. The forward end of the gear housing 14 is reinforced by vertical or transverse ribs 22 (FIGS. 2 and 3). Fore and aft ribs 23, 24 and 25 extend laterally outwardly beyond the outer periphery of the gear housing 14, and a pair of lugs 26 and 27 project laterally outwardly slightly beyond the fore and aft ribs. An internally threaded cylindrical metal insert 28 (FIG. 2) is secured to the gear housing between the lugs. The inner end of the guide bar is provided with a slot 29 (FIG. 3) having a width substantially the same as the width of the lugs, and the guide bar is secured by inserting the slotted end over the lugs and screwing bolt 30 carrying washer 31 into the insert 28. The washer clamps the guide bar against the ribs 23-25, and the lugs prevent the guide bar from rotating.

The gear housing 14 includes a cylindrical connecting flange 32 (FIG. 2) having a recess 32a in the inner surface which provides a radially extending shoulder 32b. The end of the cylindrical motor housing includes an annular flange 33 which is received in the recess 32a, and the motor housing is secured by self-tapping screws 34 which extend through outwardly extending bosses 35 on the motor housing into the flange 32 of the gear housing.

The motor includes a rotary drive shaft 36 which passes through an opening 37 in the left wall 38 of the gear housing. The opening is reinforced by an annular bushing 39, and a bearing 40 is secured therein. The annular bushing is reinforced by generally triangular ribs 41 which extend radially from the bushing. In the embodiment illustrated, a fan 42 is mounted on the drive shaft to cool the motor.

A small drive gear 43 (FIGS. 2 and 3) is splined to the end of the drive shaft and meshes with the gear teeth of an internal large driven gear 44. The internal gear is generally cup-shaped and includes a cylindrical side wall 45 and a flat end wall 46. Gear teeth 47 on the inside surface of the side wall mesh with the external gear teeth of the drive gear.

The end wall of the internal gear closes one end of the cylindrical side wall, and the open end of the side wall is positioned adjacent the generally flat wall 38 of the gear housing. The driven gear is spaced the desired distance from the wall 38 by a cylndrical bushing 48 which is formed integrally with the housing wall, and a mounting stub shaft 49 is secured within the cylindrical bushing. The stub shaft includes a first portion 49a which is non-rotatably received by the bushing and a second outer portion 49b of reduced diameter which extends laterally outwardly through the center of the driven gear. The bushing 48 is renforced by a plurality of generally triangular ribs 50 which extend radially outwardly from the bushing and are formed integrally with the bushing and the wall 38.

Referring now to FIGS. 4 and 5, the end wall 46 of the driven gear is provided with a central opening 52 which is provided with a plurality of keyways 53. A sprocket 54 (FIGS. 3 and 6) includes a sprocket portion 54a having a plurality of sprocket teeth 55 and a mounting portion 54b which includes a plurality of radially outwardly extending splines 56 to provide the sprocket with a cross-section corresponding to the shape of the opening 52 in the driven gear. The mounting portion 54b is inserted into the opening 52 so that the splines 56 are received in the keyways 53. The sprocket may be secured to the driven gear by a press fit or may be otherwise secured, as by welding. Thereafter, both the driven gear and the sprocket are mounted in the housing by inserting the driven gear and sprocket over the outer portion of the stub shaft 49 so that the stub shaft extends through the circular central opening 57 of the sprocket. The sprocket is rotatably mounted on the outer portion 49b of the stub shaft and is retained thereon by an annular washer 59 (FIG. 2) and bolt 59 which is screwed into the stub shaft. Referring again to FIG. 4, the central portion of the end wall 46 of the driven gear is embossed or extends slightly outwardly at 60 so that the sprocket teeth are spaced slightly outwardly from the outer surface of the remainder of the end wall.

As can be seen in FIG. 2, the inner or open end of the driven gear 44 is spaced slightly from the wall 38 of the gear housing. A cylindrical or arcuate wall 62 (see also FIG. 3) extends laterally to the right from the wall 38 as viewed in FIG. 2 and extends around the entire periphery of the side wall of the driven gear. The arcuate wall 62 merges with the rearwardmost transverse rib 22 at the forwardmost portion of the wall 62.

The cover portion 15 of the saw housing is removably secured to the gear housing portion 14 by bolts 64 (FIG. 1) and includes a laterally outwardly projected gear cover portion 65 which is spaced slightly outwardly from the sprocket, a top wall 66 (FIG. 3) which abuts the top wall of the gear housing 14 and a bottom wall 67 which abuts the bottom wall 68 of the gear housing along a substantial portion thereof. The bottom wall 67 terminates at 69 aproximately in line with the rearwardmost portion of the driven gear, and the cover portion 15 of the housing does not include a front wall so that the forward position of the saw housing is open between the forward edge 69 of the bottom wall 67 and the forward edge of the top wall 66.

The guide bar 12 and the saw chain 13 may be conventional and need not be described in detail. The chain rides on the guide bar and includes links 70 having bottom portions which ride within a groove in the outer periphery of the guide bar and which extend into the spaces between adjacent sprocket teeth so that the links are drivingly engaged by the sprocket.

The guide bar and chain can be mounted on the saw by inserting the slotted end of the guide bar over the lugs 26 and 27 and then positioning the chain over the sprocket 54. The guide bar is pulled outwardly until the desired tension is provided in the chain, and the guide bar is then secured by the bolt 30.

The saw is used in the conventional manner, and the sprocket 54 drives the chain in a clockwise direction as viewed in FIG. 3. Wood chips and sawdust are carried by the lower run of the chain to the left as viewed in FIG. 3, and the momentum of the chips and sawdust will continue to carry the chips and sawdust to the left when the chain begins to move around the stub shaft 49 with the sprocket. The chips and sawdust are then free to fall downwardly through the opening in the bottom of the saw housing forwardly of the edge 69 of the bottom wall 67.

Although the gears 43 and 44 are not enclosed within a sealed gear housing, the gear teeth are enclosed within the cup-shaped driven gear and are thereby protected from the wood chips and sawdust. The end wall and side wall of the driven gear also rotate clockwise as viewed in FIG. 3 and provide centrifugal force to any chips and sawdust thereon which tends to propel the chips and dust off of the driven gear. Sawdust and chips are therefore forced tangentially away from the cylindrical side wall of the driven gear rather than passing into the space between the arcuate wall 62 of the gear housing 14 and the cylindrical side wall of the driven gear and the space between the open end of the driven gear and the housing wall 38. Further, the arcuate wall 62 and the flat wall 38 cooperate with the driven gear to form a labyrinthine passage which the sawdust must pass through before it can reach the gear enclosure. This further reduces the likelihood that dust will enter into the enclosure.

In addition to enclosing the end wall 46, the side wall 45 of the driven gear serve to increase the amount of inertia of the gear above that of a conventional driven gear with external gear teeth, and the internal gear reduces the space required to achieve a comparable gear reduction by a conventional gear with external teeth. A substantial portion of the weight of the internal driven gear is located in the side wall 45 which is spaced a substantial distance from the center of the gear, and this increases the moment of inertia. The chain is therefore provided with increased inertia to reduce grabbing as the chain cuts into the wood and to provide smoother operation even at relatively low speed. The increased inertia also permits an electric motor with fewer commutator bars to be used, and this reduces the cost of the motor which is required.

The internal driven gear not only encloses the gear teeth and eliminates the need for a sealed gear housing but permits the sprocket to be mounted directly on the driven gear. This reduces machine and tolerance problems that are commonly encountered when a separate sprocket is to be connected to a sealed gear housing.

Although we have described the gears as being driven by an electric motor, the gears could also be driven by the crank shaft of an internal combustion engine or some other power means.

In the specific embodiment illustrated the drive gear 43 includes eleven teeth, and the driven gear includes 59 teeth to provide a gear reduction of about 5.4 to 1. The sprocket includes only seven teeth, which is less than conventional chain saw sprockets, and this provides a further reduction between the speed of the drive shaft and the speed of the chain.

From the foregoing it is seen that the chain saw housing is formed from three integrally molded plastic parts—the gear housing 14, cover 15, and motor housing 19— which are bolted or screwed together. The plastic may advantageously be a polycarbonate material. The left hand grip 17 is formed integrally with the gear housing, and this eliminates the requirement for attaching this part separately.

While in the foregoing specification, a detailed description of a specific embodiment of the invention was set forth for the purpose of illustration, it is to be understood that many of the details herein given may be varied considerably by those skilled in the art without departing from the spirit and scope of the invention.

We claim:

1. In a chain saw having a housing, a guide bar mounted on the housing, a saw chain extending around the guide bar and slidably supported thereby, and power means for driving the chain around the guide bar, the improved drive means for connecting the power means and the chain comprising a generally cup-shaped first gear rotatably mounted in the housing, the first gear having a cylindrical side wall and an end wall having inner and outer surfaces, the side wall of the first gear having gear teeth on the inside surface thereof, a sprocket mounted on the outer surface of the end wall of the first gear and drivingly engaging the chain, a drive shaft connected to the power means for rotation thereby, a second gear mounted on the drive shaft and meshing with the gear teeth of the first gear whereby rotation of the drive shaft rotates the sprocket and drives the chain around the guide bar.

2. The structure of claim 1 in which the housing includes a wall through which the drive shaft extends and on which the first gear is mounted, the housing wall extending adjacent the open end of the cylindrical side wall of the first gear whereby the second gear and the gear teeth of the first gear are substantially enclosed.

3. The structure of claim 2 in which the housing includes an arcuate wall extending generally perpendicularly to the first wall of the housing, the arcuate wall extending around at least a portion of the outer periphery of the cylindrical side wall of the first gear.

4. The structure of claim 1 in which the housing includes an arcuate wall extending around at least a portion of the outer periphery of the cylindrical side wall of the first gear.

5. The structure of claim 1 in which the power means is an electric motor.

6. The structure of claim 1 in which the end wall of the first gear is provided with a central opening, the sprocket including a mounting portion extending through an opening in the end wall.

7. The structure of claim 6 including a mounting shaft mounted on a housing, the sprocket being provided with a central opening and the mounting shaft extending through the central opening of the sprocket, the first gear and the sprocket being rotatably mounted on the mounting shaft.

8. The structure of claim 1 in which the first gear and the sprocket are provided with a central opening therethrough and the housing includes a mounting shaft extending through the central opening, the first gear and the sprocket being rotatably mounted on the mounting shaft.

9. The structure of claim 1 in which the housing comprises a pair of housing portions which are removably secured together and each of which is integrally molded from plastic.

10. The structure of claim 9 in which one of the housing portions includes a substantially flat wall and an arcuate wall extending generally perpendicularly from the flat wall, the drive shaft extending through the flat wall, the first gear being rotatably mounted on the flat wall and the flat wall extending adjacent the open end of the cylindrical side wall of the first gear, the arcuate wall extending around at least a portion of the periphery of the cylindrical side wall of the first gear whereby the second gear and the gear teeth of the first gear are substantially enclosed.

11. The structure of claim 9 including a left hand grip formed integrally with one of the housing portions and extending therefrom.

* * * * *